United States Patent [19]

Ryan

[11] 4,040,575

[45] Aug. 9, 1977

[54] TAPE GUIDING STRUCTURE

[75] Inventor: Dennis M. Ryan, Redwood City, Calif.

[73] Assignee: Ampex Corporation, Redwood City, Calif.

[21] Appl. No.: 681,468

[22] Filed: Apr. 29, 1976

[51] Int. Cl.² .......................................... B65H 27/00
[52] U.S. Cl. ..................................... 242/76; 242/192
[58] Field of Search ................ 242/76, 193, 197, 199; 226/196, 197

[56] References Cited

U.S. PATENT DOCUMENTS

| | | | |
|---|---|---|---|
| 3,189,289 | 6/1965 | Maxey | 242/76 X |
| 3,432,084 | 3/1969 | Bussche | 226/197 |
| 3,691,315 | 9/1972 | Ellmore | 242/192 X |
| 3,940,791 | 2/1976 | Kayon | 242/199 |

Primary Examiner—Edward J. McCarthy
Attorney, Agent, or Firm—Charles M. Carman, Jr.

[57] ABSTRACT

For guiding tape between a reference planar path and a helical path that is axially tilted with respect to the reference plane, there is provided a single right-cylindrical guide having normal flanges that engage the tape edges with uniform pressure throughout the zone of contact.

5 Claims, 5 Drawing Figures

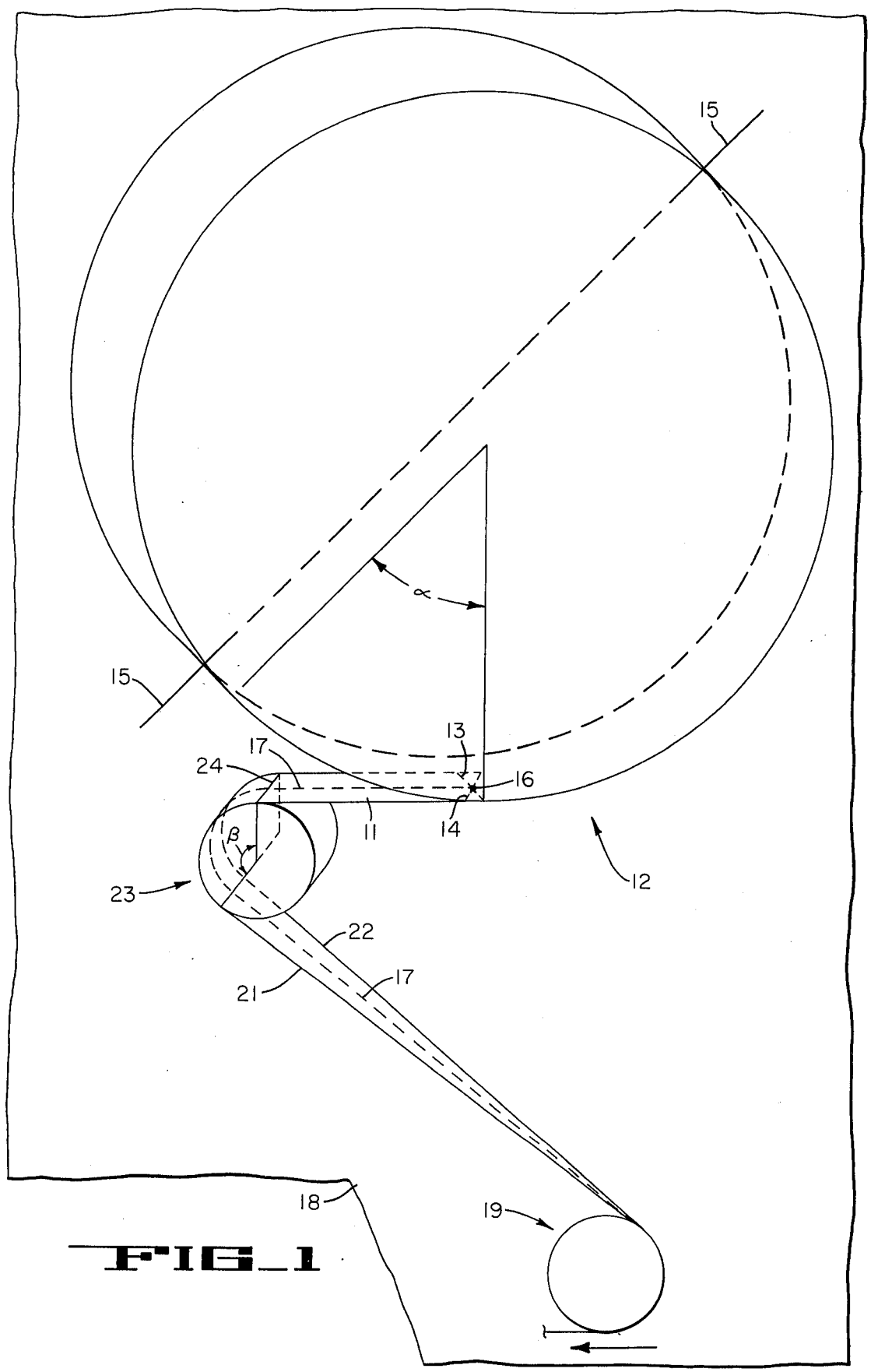
FIG_1

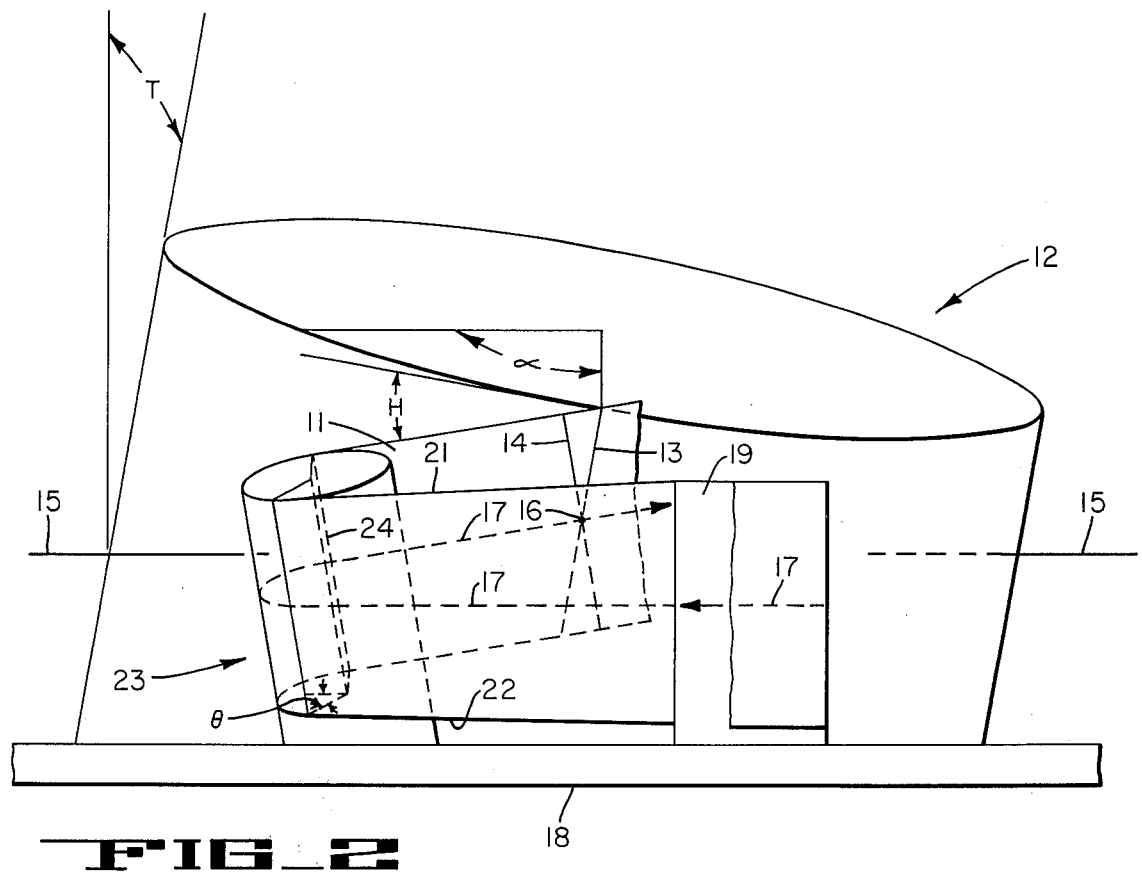
FIG_2
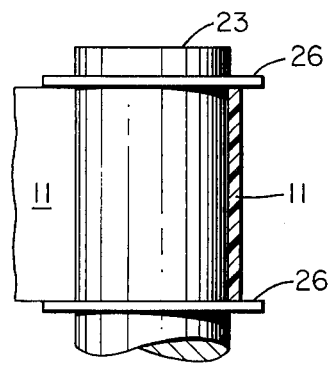
FIG_3
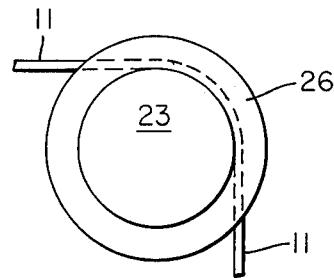
FIG_4

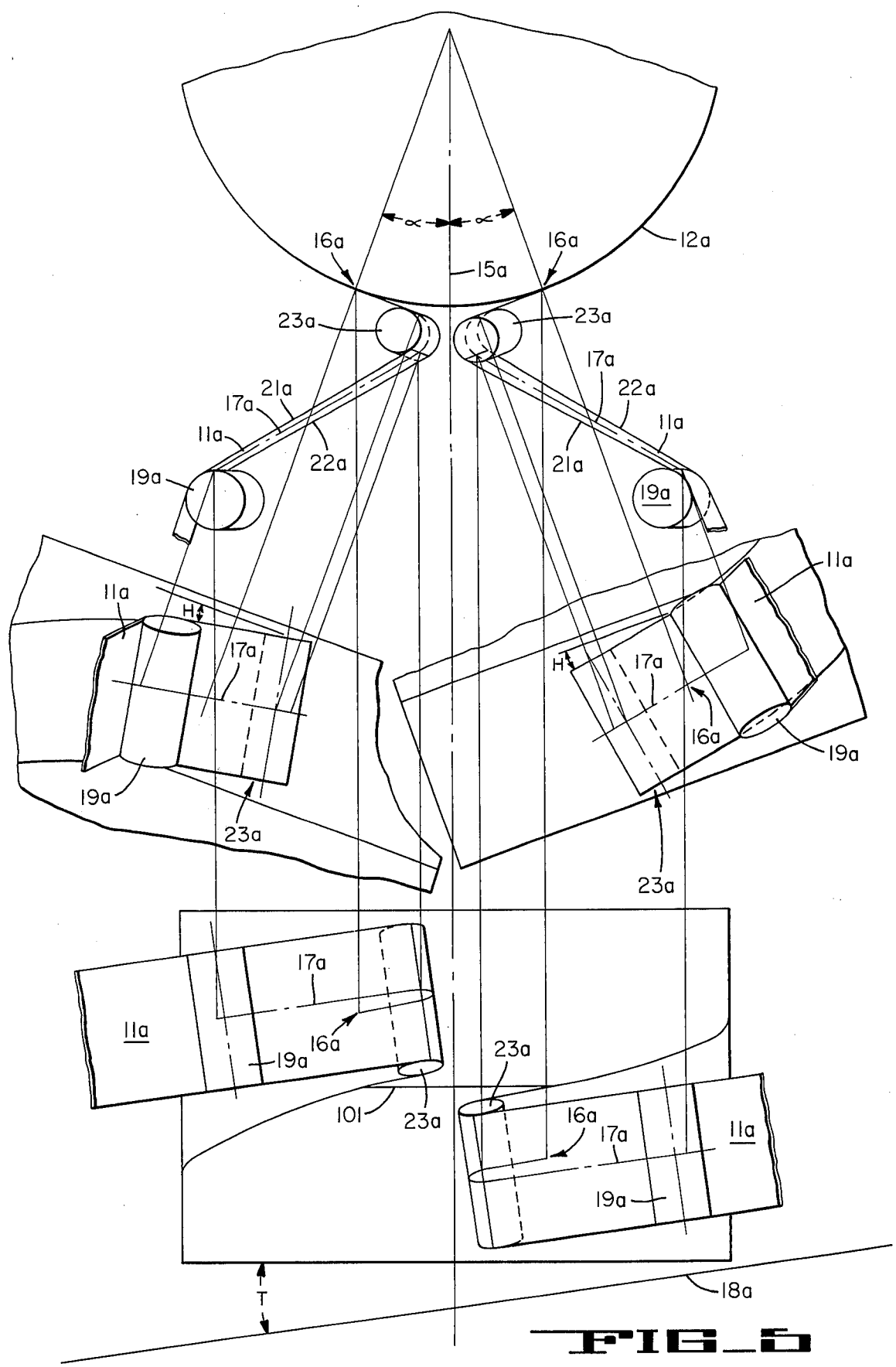

TAPE GUIDING STRUCTURE

BACKGROUND OF THE INVENTION

This invention relates to edge-guiding of tape approaching and leaving a helical path on a drum, and particlarly such guiding adapted to conduct the tape into and from paths that are parallel to a reference plane with respect to which the drum is tilted.

In U.S. Pat. No. 3,189,289 there is disclosed a magnetic tape guiding structure in which the tape is guided to and from a helical path on a scanning drum to a path that is parallel to a predetermined reference plane. This solution employs a number of right-cylindrical roller guides engaging the tape tangentially along generatrices that are normal to the tape centerline, each guide being skewed with respect to the adjacent guides, but only in planes that are parallel to one another, so as to twist the tape about its centerline without causing it to wrap helically around the rotating guides. In this structure the drum is simply normal to the reference plane. The present invention utilizes a similar principle but for a different and more complex purpose, which is to provide smooth planar edge-guiding of the tape in either a fixed or rotating guide system; and the present invention utilizes only a single intermediate guide between the reference plane and either side of the helix, with the additional complication that the helical drum is tilted with respect to the reference plane.

U.S. Pat. No. 3,691,315 discloses a system for guiding magnetic tape between a helical path on a scanning drum and a reference plane, with only one intermediate guide on either side of the helix. In this structure, the helical scanning drum also embodies an additional complication in being tilted with respect to the reference plane. The intermediate guide is mounted to be axially parallel to the drum, which simplifies its mounting, but which renders it less suitable for edge-guiding purposes, because the tape wrap thereabout is helical in form, and edge-guiding flanges, if mounted thereon, would have to be non-planar in form; that is, they would have to follow a complex helically warped surface in order to avoid undue pressure on the tape edges. Planar edge guides have been tried on such guides, but it has been found that they engage the tape edges at only one or two tangential points, at which all of the edge-guiding forces become concentrated, resulting in undue wear and damage to the tape, and inaccurate guiding, caused by variable curling of the tape edges. It is true that in the environment disclosed, in which two magnetic scanning heads are used, the tape warp being only 180 degrees, it is quite satisfactory to mount the edgeguiding flanges as shown on those cylindrical guides that are nearest to the drum, and around which the tape is wrapped in a plane normal to the guide. However, for use with drums having only one rotating scanning head, around which the tape is wrapped helically for 360° or slightly less, and for uses in which the results must meet extremely rigorous standards, it is preferable to mount the edge guides on those guides that are closest to the entrance and exit points of the helical tape path around the drum. The present invention, in addressing itself to this problem, combines the solutions taught by U.S. Pat. No. 3,189,289 to Maxey and U.S. Pat. No. 3,691,315 to Ellmore.

U.S. Pat. No. 3,432,084 to Van Den Bussche teaches a guiding system in which the tape is bent around the equivalent of a guide post in a helix and without the use of edge guiding flanges.

U.S. Pat. No. 3,940,791 t Kayan et al. and U.S. Pat. No. 3,414,684 to Lichowsky each shows a helical guiding system for solving a simpler problem, in which the tilt of the drum is in the same plane as the helix angle inclination of the tape.

Accordingly, it is an object of the present invention to edge guide tape between planar and tilted helical paths, with least wear and damage to the tape edges.

BRIEF DESCRIPTION OF THE INVENTION

This and other objects are accomplished in a structure in which there is provided a single right-cylindrical guide having normal flanges that engage the tape edges with uniform pressure throughout the zone of contact.

DESCRIPTION OF THE DRAWINGS

FIG. 1 is a geometrical construction plan view of the structure of the invention;

FIG. 2 is a geometrical construction in elevational view of the structure of FIG. 1;

FIG. 3 is an elevational view of a portion of the structure of FIGS. 1 and 2, showing edge guides for the tape;

FIG. 4 is a plan view of the guide of FIG. 3; and

FIG. 5 is a composite projection of a different embodiment of the invention.

DESCRIPTION OF THE PREFERRED EMBODIMENTS

Referring now to the drawings, and particularly to FIGS. 1 and 2 thereof, there is shown a tape 11, wound helically on a drum 12 at a predetermined helix pitch angle H. The tape lies in a tangential plane of the drum and comes into engagement with the drum along a generatrix 13 of the drum, which is the line of tangency. Above and to the right of generatrix 13 the tape is helically wrapped but is here shown as broken off for the sake of clarity in the drawings, and the drum 12 is shown as truncated above this point for the same reason. Likewise, since FIGS. 1 and 2 are essentially geometrical constructions including lines such as line 13 which would not be visible at all in the actual apparatus, such lines have here and there been shown as solid for the sake of clarity.

Accordingly, a line 14 is also shown, representing the transverse width of the tape at the point 16 of tangency with the drum, and crossing the line 13 at the centerline 17 of the tape. The drum 12 is tilted, as about an axis 15, so as to be inclined at a dihedral angle T with respect to a plate 18, representing a reference plane such as a top plate or tape deck of a magnetic tape transport. The axis 15 is parallel to plate 18 and is angularly displaced from tangent 13 by an angle α. The moving tape is guided in a path parallel to the plate 18 as by means of a set of cylindrical guides 19. Between the guides 19, the tape centerline and both upper and lower edges 21 and 22 are parallel to the plate 18, and the transverse width of the tape is everywhere normal to the plate 18. The tape is illustrated as broken off below the guides 19, but it will be understood that both upstream and downstream from the illustrated portions of the tape, it is tensioned and driven by means well-known in the art and not here illustrated.

In the illustrated structure, the tape leaving (or approaching) the drum, lies in a tangential plane of the drum, which plane is also tangent to the surface of a right-cylindrical guide 23, here shown as a right circular-cylindrical guide, which may be fixed (as a post), or rotating (as a roller). Most imortantly, the line of tangency 24 of the tape meeting the drum is also a generatrix of the guide 23, so that the centerline and edges pass around the guide in planes normal to the guide, and the guide is thus adapted to be fitted with simple planar edge-guiding flanges 26 (FIGS. 3 and 4).

Returning to FIGS. 1 and 2, it will be seen that two other angles must be taken into account in the determination of the tape path necessary to fulfill the above-mentioned conditions. These are the dihedral angle $\theta$ representing the tilt of the plane of the tape centerline 17 passing around the guide 23, which is also the tilt of the guides 23 with respect to the plate 18; and the angle $\beta$, taken either in the plane of plate 18 or in a plane normal to the drum axis, which represents the wrap of tape around the guide 23 and is also a function of the angular offset of guide 19 from tilt axis 15.

Angle $\theta$ may be calculated from any appropriate equations derived from the geometry shown. Below are given two such equations involving differents sets of parameters:

$$\sin \theta = [(\sin \alpha \sin H)^2 + \sin^2 (\arctan (\tan H \cos \alpha) - T)]^{1/2} \quad (1)$$

valid where $\cos T \simeq 1$; or $$\sin H \tan \alpha = \sin \theta (\sin \beta \tan \alpha - \cos \beta) \quad (2)$$

In equation (2), the angle $\beta$ is taken in the plane of the top plate 18.

Also to be determined is the agle of wrap $\beta$, of the tape around guide 23 necessary to bring the tape centerline 17 out parallel to plate 18 on its path to the guides 19. As shown in FIG. 2, this angle indicates the lowest point of the traverse of centerline 17 around the guide; and as shown in FIG. 1, angle $\beta$ indicates the point at which the tape width (and guide generatrix) lies in a plane that is normal to the plate 18 and parallel to the generatrices of the nearest guide 19. Accordingly, the tape is twisted about its centerline between guides 23 and 19, but the centerline itself is parallel to plate 18. Angle $\beta$ may also be computed by ordinary trigonometrical means, as from the following equation, $\beta$ being taken in the plane of the top plate:

$$\sin H = \cos \theta \ \alpha \tan T + \sin \theta \sin \beta. \quad (3)$$

As will be seen, the calculation of angle T as an unknown will sometimes be useful, and for this purpose, either equation (3) above may be used, or the following equation, in which $\beta$ is taken, like $\alpha$, in a plane normal to the drum axis:

$$\tan T \cos (\alpha + \beta) = \cos \beta \tan H \quad (4)$$

Referring now to FIG. 5, the layout of a full tape path is illustrated. In this Figure, the drum 12a is illustrated at the top in a plan view taken normal to the scanning plane 101 of the drum, shown in the lower portion of the Figure, which is a projection normal to the plan view of the upper portion. Plate 18 is shown as line 18a, and angle T is therefore illustrated in full (not foreshortened). The helix angle H is also illustrated in full in the projections in the mid-portion of the drawing, taken normal to the tape planes at its two points of tangency with the drum. Other elements 11a, 12a, 13a, 15a, 16a, 17a, 18a, 19a, 21a, 22a, and 23a are counterparts of the correspondingly numbered parts of the structure shown in FIGS. 1 and 2.

FIG. 5 illustrates the geometry of an actual system, in which a drum 12a was used, with a tape 11a wrapped 344° around the drum, the angle $\alpha$ being taken as 8.00°. In this geometry, the helix angle H was predetermined to be 3.13°, in order for the recorded tape to be compatible with and usable in other machines; and an additional restriction was predetermined in that the available space permitted the locations of the guides 19a only at the points shown, so that the angle $\beta$ was predetermined at 108.88°. Given these parameters, it was required to calculate the correct angle of tilt T and the inclination $\theta$ of the guide 23a. This angle $\theta$ is also the angle of twist in the tape between guides 23a and 19a, and it was desired to calculate the amount of twist per unit length of tape path between guides 23a and 19a, in order to ensure that the stretch of the tape edges did not exceed the elastic limit of the tape material, nor unduly distort the tape in the vicinity of the scanning zone.

Using equation (4), T is found to be $T = 2.2°$; and using either equations (1) or (2), $\theta = 0.984°$. It is important to note that equations (2) and (3) are arranged to accept all angles as positive angles, even though H and T are taken in opposite directions in the particular example.

Thus there has been described a system for guiding tape between a referenc planar path and a helical path that is axially tilted with respect to the reference plane, there is provided a single right-cylindrical guide having normal flanges that engage the tape edges with uniform pressure through the zone of contact.

I claim:

1. Structure for guiding at least one shank of tape between a cylindrical drum on which the tape is helically wrapped, and a number of first cylindrical guides normal to a predetermined reference plane, the drum being tilted with respect to the reference plane, and the tape centerline on the first cylindrical guide being parallel to the reference plane, comprising:
   at least one second cylindrical guide for said tape shank, each second guide having a sector thereof engaging the respective shank of tape between the drum and the first guides;
   said second guides being mounted with the generatrices thereof that lie in the tape engaging sectors thereof oriented to be perpendicular to the tape centerline around the sector; and
   at least one of said second guides having tape edge-guiding flanges formed thereon in planes normal thereto.

2. Tape guiding structure as recited in claim 1, wherein each tape shank extending between a set of first and second guides is tangent to the second guide in said set along a generatrix thereof that lies in a plane parallel to the generatrices of said first guides.

3. Tape guiding structure as recited in claim 1, wherein the generatrix of tangency of the shank of tape extending to the respective second guide from said drum lies in a tangential plane of said drum.

4. Tape guiding structure as recited in claim 1, wherein there are two shanks of tape extending from said drum, each shank being engaged by a single one of said second guides.

5. Structure for guiding a tape extending from a cylindrical drum on which the tape is helically wrapped, said tape extending in two shanks from said drum to a number of first cylindrical guides that are normal to a predetermined reference plane, the drum being tilted with respect to said reference plane, and the tape centerline on the first guides being parallel to the reference plane, comprising:

a single second cylindrical guide for each tape shank, said respective second guide being mounted with the generatrix of tangency thereof with the respective shank extending from the drum oriented to lie in the tangential plane of tape and drum and to be perpendicular to the tape centerline around said second guide;

said respective second guide being tilted with respect to the adjacent first guide and the two guides being relatively angularly positioned so that the tape centerline therebetween is mutually perpendicular to the respective generatrices of said two guides, the tape being twisted about said centerline in passage between said two adjacent first and second guides.

* * * * *